UNITED STATES PATENT OFFICE.

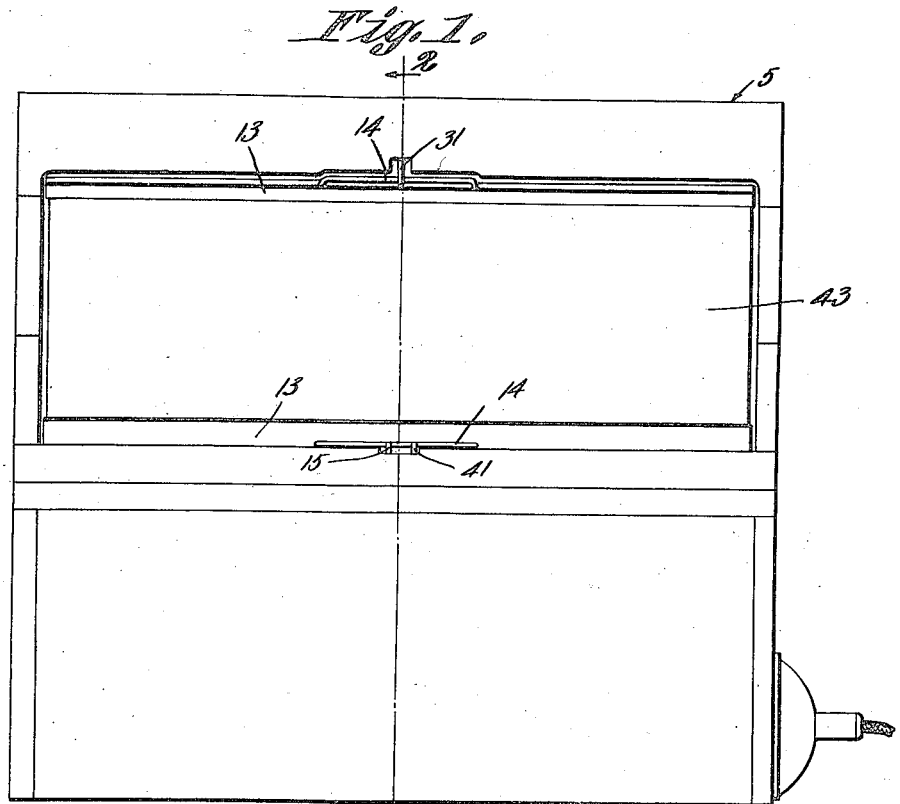
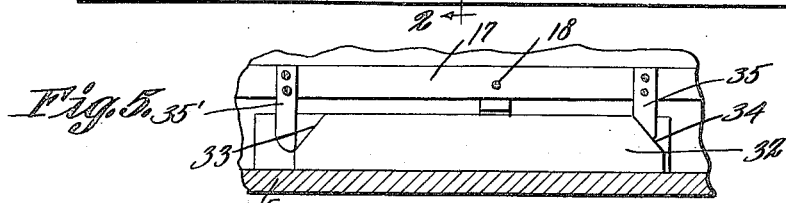
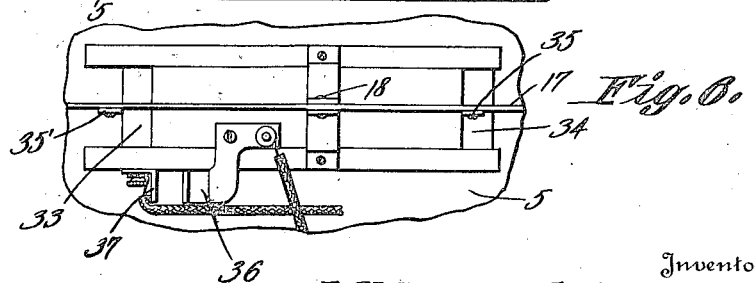

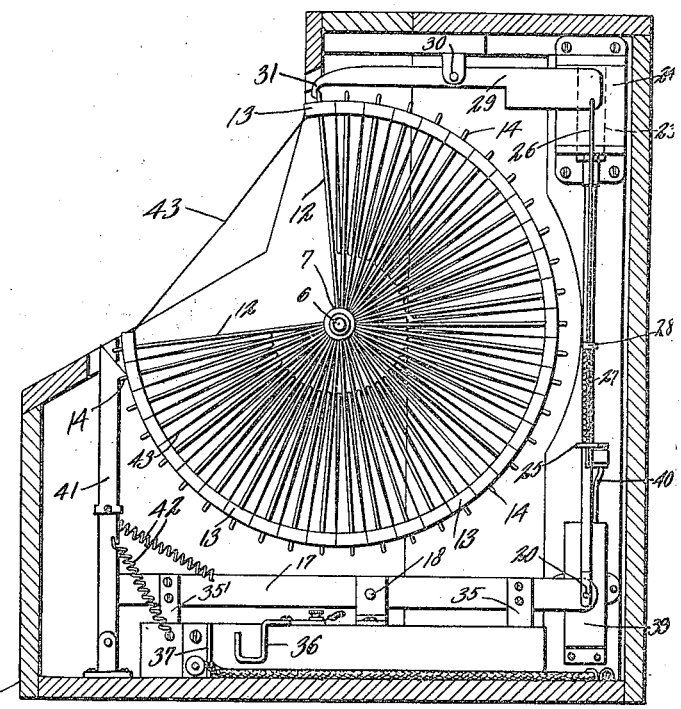
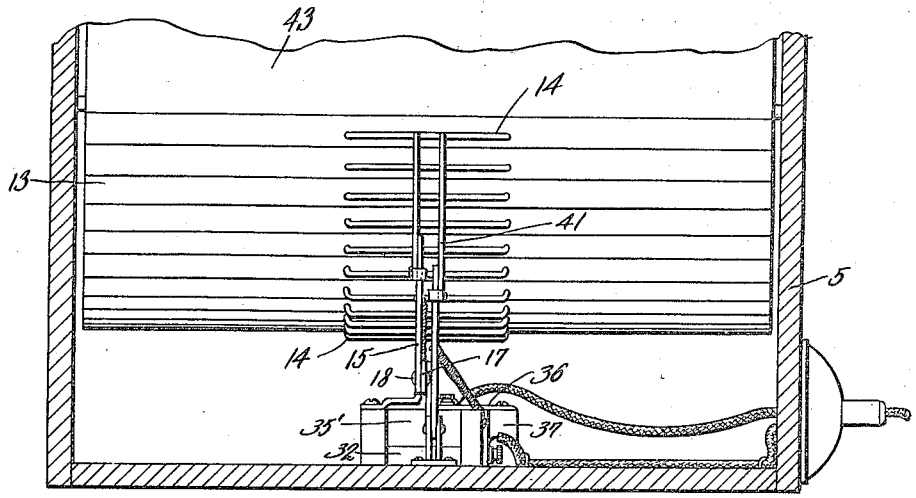

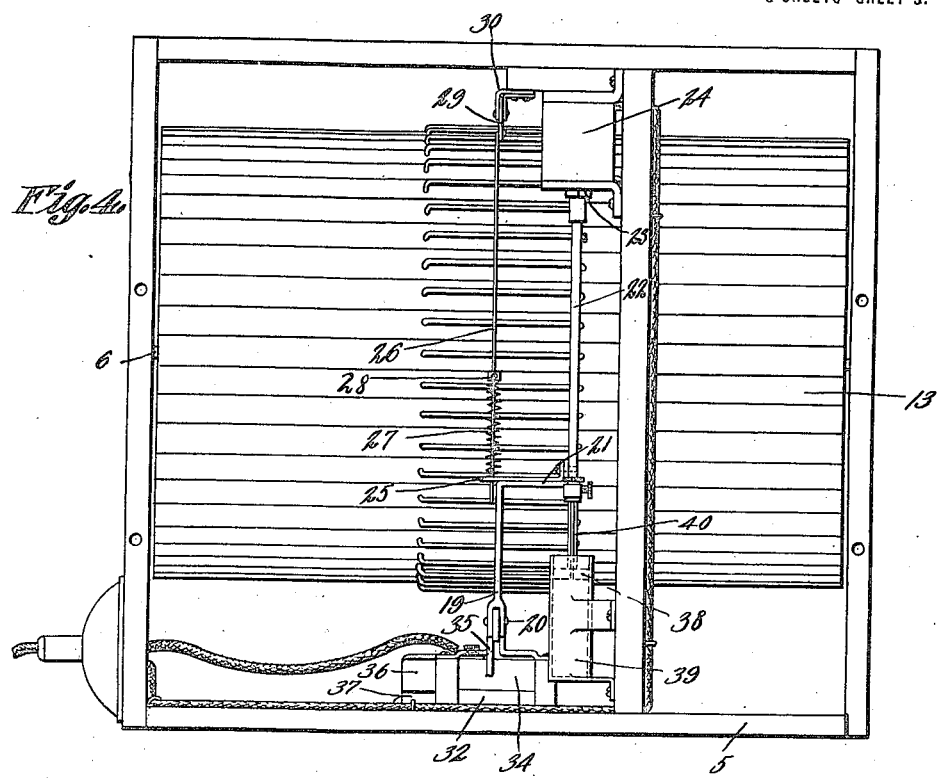
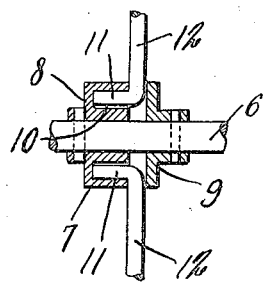
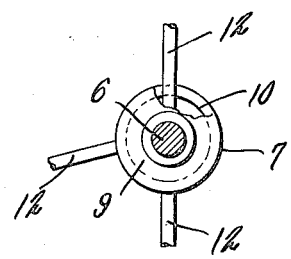

LUCIUS H. CAMMACK AND HENRY A. BROWN, OF HUNTINGTON, WEST VIRGINIA.

ROTARY ADVERTISING DEVICE.

1,424,449.  Specification of Letters Patent.  Patented Aug. 1, 1922.

Application filed January 4, 1922. Serial No. 526,906.

*To all whom it may concern:*

Be it known that we, LUCIUS H. CAMMACK and HENRY A. BROWN, citizens of the United States, residing at Huntington, in the county of Cabell and State of West Virginia, have invented a new and useful Rotary Advertising Device, of which the following is a specification.

This invention relates to changeable exhibitors, the primary object of the invention being to provide means for moving advertising or display cards to a position adjacent the display opening of the device, at predetermined intervals.

Another object of the invention is to provide a plurality of independent card supporting frames, means being provided for continuously rotating the frames to bring them to positions at the upper portion of the casing, whereby they may fall by gravity to their active positions.

Another object of the invention is to provide a novel form of switch actuating means employed for intermittently controlling the operation of the solenoid forming a part of the operating means to accomplish the rotation of the card supporting frames.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a front elevational view of an advertising device constructed in accordance with the present invention.

Figure 2 is a sectional view taken on line 2—2 of Figure 1.

Figure 3 is a fragmental elevational view of the forward portion of the device, the housing being shown in section.

Figure 4 is a rear elevational view of the device, the rear wall thereof being removed.

Figure 5 is a detail view of the switch actuating means for controlling a solenoid.

Figure 6 is an enlarged detail view of the switch member.

Figure 7 is a fragmental detail view disclosing means for securing the card frames to the main shaft.

Figure 8 is an elevational view of the same, a portion of the frame supporting hub, being broken away.

Referring to the drawings in detail, the device embodies a frame or housing indicated generally by the reference character 5, the forward portion thereof being cut away to accommodate a suitable glass, and provide a display opening, through which the cards, forming the essence of the invention, may be viewed.

Supported by the end walls of the housing, is a main or supporting shaft indicated at 6, which has hubs 7 secured thereto at points adjacent to the ends thereof, the hubs including opposed members 8 and 9 respectively. The members 8 are formed with grooves 10 to accommodate the right angled ends 11 of the legs 12, that form a part of each of the card supporting frames.

A bar 13 forms a part of each of the card supporting frame, and is secured along the outer edge thereof, each bar supporting a keeper indicated at 14, the keepers being designed to cooperate with the movable finger 15 employed for moving the frames to positions adjacent the display opening.

The movable finger 15 is pivotally supported within the housing, and has connection with the operating arm 17 at one end thereof, the arm 17 being pivotally supported as at 18 to permit the same to rock in a vertical plane.

One end of the arm 17 terminates at a point adjacent to the rear wall of the housing, and has connection with the arm 19 as at 20, whereby movement of the arm 19 produces a relative movement of the arm 17 to operate the finger. The arm 19 is formed with a right angled extremity 21 that has connection with the vertical rod 22 that carries the core 23 of the solenoid 24 at the upper end thereof.

Supported by the right angled portion 21 of the arm 19 is a bar 25 formed with an opening to accommodate the lower extremity of the rod 26 and permit the rod 26 to move with respect to the bar 25, when the mechanism is in operation. A coiled spring indicated at 27 connects the rod 26 and bar 25, suitable adjusting means indicated at 28 being provided to adjust the tension of the spring 27.

As shown, the upper extremity of the rod 26 has connection with the movable finger 29 which is pivotally supported as at 30, the forward extremity of the finger 29 being curved as at 31 to contact with the keeper of the card supporting frame that has been moved to the forward portion of the housing.

Associated with the arm 17 is a movable switch member 32 that has inclined walls 33 and 34 formed at the ends thereof, which walls cooperate with the depending fingers 35 and 35' that are carried by the arm 17 to cause the movable member 32 to reciprocate when the arm 17 is moved.

Carried by the movable switch member 32 is a movable contact member 36 adapted to move into engagement with the stationary contact member 37 to complete the circuit to the solenoid 24 to cause the same to draw its core 23 upwardly.

The lower end of the rod 22 carries a piston 38 that moves in the cylinder 39 to retard movement of the rod 22 when the same is moving downwardly by gravity. In order that the air within the cylinder 39 may exhaust, a tube 40 is provided, through which tube the air passes from the cylinder 39 upon the downward movement of the piston 38.

A pivoted finger 41 also engages the keepers 14 and prevents reverse movement of the series of card supporting frames, when the same have been moved in anti-clockwise directions to expose another card. Coiled springs 42 connect the fingers 41 and 15, with a portion of the device to cause the fingers to be normally held to the limit of their inward movements where the upper extremities thereof will lie within the path of travel of the keepers 14 as the frames are being rotated within the housing.

The cards which embody the signs have connection with adjacent card supporting frames as clearly shown by Figure 2 of the drawings. When two frames are moved to positions as shown by Figure 2 of the drawings, the cards which are indicated at 43 take positions as shown in Figure 2 to display the sign before the display opening of the device.

In the operation of the device, Figure 2 of the drawings discloses the same after the solenoid has acted to draw its core upwardly, the contact members 36 and 37 being out of contact with each other permitting the rod 22 to move downwardly by gravity. It follows that the downward movement of this rod 22 moves the arm 17 causing the finger 35 to move over the surface 34 resulting in a sliding movement of the switch member 32. As the switch member 32 moves to bring the contact members 36 and 37 into contact, the solenoid is again energized, whereby the finger 15 moves downwardly causing the several card supporting frames to rotate in an anti-clockwise direction.

As the finger 15 moves downwardly, it is obvious that the finger 35' contacts with the inclined wall 33 to reverse the movement of the switch member 32, to disconnect the circuit and deenergize the solenoid, permitting the finger 29 to pivot and disengage the keeper associated therewith. When the finger 29 disengages the keeper adjacent thereto, it is obvious that the frame supporting the keeper will fall by gravity to a position adjacent to the finger 15 to display the sign.

It will thus be seen that various signs may be placed on the cards between adjacent frames, to the end that they will be displayed before the display opening of the housing, as the machine is put into operation.

Having thus described the invention, what is claimed as new is:—

1. In a device of the character described, a housing, a shaft supported in the housing, a plurality of card supporting frames movable on the shaft, each of said frames including a pair of legs, a bar supported by the legs and carrying a keeper, pivoted fingers having connection with the keepers to release the frames at predetermined intervals, electrically controlled means for operating the fingers, and cards carried by the frames.

2. In a device of the character described, a housing, a plurality of hinged card supporting frames supported within the housing, a pivoted finger supported adjacent to the upper portion of the housing, a solenoid, a rod having connection with the core of the solenoid, a pivoted finger mounted at the base of the housing, means for connecting the fingers to the rod connected with the solenoid, whereby movement of the core of the solenoid produces a relative movement of the hinged card supporting frames.

3. In a device of the character described, a housing, a plurality of hinged card supporting frames supported within the housing, a keeper carried by each frame, a pivoted finger operating in the upper portion of the housing, and adapted to contact with one of the keepers for preventing movement of the frames, a pivoted finger operating at the base of the housing and contacting with the keepers for restricting movement of the frames in the opposite direction, and means for operating the fingers to control the movements of the frames.

In testimony that we claim the foregoing as our own, we have hereto affixed our signatures in the presence of two witnesses.

LUCIUS H. CAMMACK.
HENRY A. BROWN.

Witnesses:
B. B. RECTOR,
S. V. HAWORTH.